UNITED STATES PATENT

(12) United States Patent
Horii et al.

(10) Patent No.: US 7,847,056 B2
(45) Date of Patent: Dec. 7, 2010

(54) METHOD FOR PRODUCING FLUORINE-CONTAINING (METH)ACRYLATE POLYMER AND POLYMER PRODUCED BY SUCH METHOD

(75) Inventors: Etsuo Horii, Neyagawa (JP); Hirosuke Kawabata, Akashi (JP); Toshikazu Hirao, c/o Osaka University, 1-1, Yamadaoka, Suita-shi, Osaka 565-0871 (JP); Akiya Ogawa, Sakai (JP); Xiaoliang Xu, Suita (JP)

(73) Assignees: Kaneka Corporation, Osaka-shi (JP); Toshikazu Hirao, Suita-shi (JP)

( * ) Notice: Subject to any disclaimer, the term of this patent is extended or adjusted under 35 U.S.C. 154(b) by 853 days.

(21) Appl. No.: 10/594,977

(22) PCT Filed: Mar. 25, 2005

(86) PCT No.: PCT/JP2005/005524

§ 371 (c)(1),
(2), (4) Date: Jun. 6, 2007

(87) PCT Pub. No.: WO2005/097839

PCT Pub. Date: Oct. 20, 2005

(65) Prior Publication Data

US 2008/0004424 A1 Jan. 3, 2008

(30) Foreign Application Priority Data

Mar. 31, 2004 (JP) ............................ 2004-101708

(51) Int. Cl.
*C08G 63/50* (2006.01)
*C08G 73/24* (2006.01)
*C08F 6/06* (2006.01)

(52) U.S. Cl. .................. 528/401; 528/485; 528/486; 528/488; 528/489

(58) Field of Classification Search .................. 528/401, 528/495, 485, 486, 488, 489
See application file for complete search history.

(56) References Cited

U.S. PATENT DOCUMENTS 4,696,754 A    9/1987 Conroy et al.

(Continued)

FOREIGN PATENT DOCUMENTS

JP    62-54162 A    3/1987

(Continued)

OTHER PUBLICATIONS

English translation of International Preliminary Report on Patentability for PCT/JP2005/005524 mailed on Oct. 26, 2006.

(Continued)

*Primary Examiner*—Duc Truong
(74) *Attorney, Agent, or Firm*—Westerman, Hattori, Daniels & Adrian, LLP

(57) ABSTRACT

An object of the invention is to provide a fluorine-containing (meth)acrylate polymer readily at a low cost without using any special polymerization facilities. Thus, the invention provides a fluorine-containing (meth)acrylate polymer obtained by reacting a (meth)acrylate polymer with an alcohol containing a fluorine atom represented by General Formula 1:

$$R_f(CH_2)_n OH \qquad (1)$$

wherein $R_f$ is a fluoroalkyl group or a fluoroalkyl ether group of 1 to 15 carbon atoms containing at least one or more fluorine atoms and n is an integer of 0 to 10 as well as a method for producing the same.

11 Claims, 1 Drawing Sheet

U.S. PATENT DOCUMENTS 4,882,403 A    11/1989    Itoh et al.

FOREIGN PATENT DOCUMENTS

| JP | 64-52121 A | 2/1989 |
| JP | 1-185520 A | 7/1989 |
| JP | 3-168650 A | 7/1991 |
| JP | 11-255829 A | 9/1999 |

OTHER PUBLICATIONS

International Search Report of PCT/JP2005/005524, date of mailing Jun. 28, 2005.

METHOD FOR PRODUCING FLUORINE-CONTAINING (METH)ACRYLATE POLYMER AND POLYMER PRODUCED BY SUCH METHOD

TECHNICAL FIELD

The present invention relates to a method for producing a fluorine-containing (meth)acrylate polymer.

BACKGROUND ART

It is known that by introducing a fluorine atom into a molecular structure of a polymer an improvement in heat resistance, weathering resistance, electric property, sliding performance, chemical resistance, water-repelling or oil-repelling performance or mechanical property can be achieved when compared with an existing hydrocarbon-based plastic, and various fluorine resins such as polytetrafluoroethylenes and polyvinylidene fluorides have been marketed so far. However, a fluorine resin is used currently only in a limited range since it is very expensive and has a poor moldability.

On the other hand, a (meth)acrylate polymer is a very inexpensive versatile resin, and it has already been proposed that by using this polymer as a starting material and introducing a certain functional group a novel resin can be obtained. For example, Japanese Unexamined Patent Publication No. 6-240017 discloses a technology for effecting an imidation by reacting a (meth)acrylate polymer with a primary amine, which is purported to improve the heat resistance of the (meth)acrylate polymer (See patent reference 1).

While there are two ways for introducing a fluorine atom into a (meth)acrylate polymer, one being a method of producing from a monomer such as a method of polymerizing a fluorine atom-substituted (meth)acrylate monomer (see patent references 2 and 3) and the other being a method of utilizing an existing polymer such as a method of reacting a (meth)acrylic acid polymer or a (meth)acrylate polymer with a fluorine atom-containing amine (see patent references 4 and 5), the former method requires a special polymerization facility and the latter method employs an expensive and highly toxic fluorine atom-containing amine, thus both posing problems.

[Patent Reference 1]

Japanese Unexamined Patent Publication No. 6-240017

[Patent Reference 2]

Japanese Examined Patent Publication No. 55-23567

[Patent Reference 3]

Japanese Unexamined Patent Publication No. 11-255829

[Patent Reference 4]

Japanese Unexamined Patent Publication No. 7-118339

[Patent Reference 5]

Japanese Unexamined Patent Publication No. 3-243609

DISCLOSURE OF THE INVENTION

Technical Problems to be Solved

An object of the invention is to provide a fluorine-containing (meth)acrylate polymer readily and simply at a low cost without using any special polymerization facilities.

Means to Solve the Problems

To accomplish the object described above, we made an effort and finally discovered a method for producing a fluorine-containing (meth)acrylate polymer readily at a low cost by means of reacting a (meth)acrylate polymer with an alcohol containing a fluorine atom, thus establishing the invention.

Thus the invention is:

(1) a method for producing a fluorine-containing (meth)acrylate polymer comprising:

reacting a (meth)acrylate polymer with an alcohol containing a fluorine atom represented by General Formula 1:

$$R_f(CH_2)_nOH \qquad (1)$$

wherein $R_f$ is a fluoroalkyl group or a fluoroalkyl ether group of 1 to 15 carbon atoms containing at least one or more fluorine atoms and n is an integer of 0 to 10;

(2) the method for producing a fluorine-containing (meth)acrylate polymer according to (1), wherein the reaction is conducted in the presence of a transesterification catalyst;

(3) the method for producing a fluorine-containing (meth)acrylate polymer according to (2), employing a transesterification catalyst consisting of at least one selected from alkaline metal carbonates, alkaline earth metal carbonates, alkaline metal bicarbonates and alkaline metal hydroxides as a transesterification catalyst;

(4) the method for producing a fluorine-containing (meth)acrylate polymer according to (2), employing a transesterification catalyst consisting of at least one selected from Lewis acids and protic acids as a transesterification catalyst;

(5) the method for producing a fluorine-containing (meth)acrylate polymer according to (4), employing a transesterification catalyst consisting of at least one selected from vanadium-based compounds, titanium-based compounds, zirconium-based compounds and hafnium-based compounds as a Lewis acid;

(6) the method for producing a fluorine-containing (meth)acrylate polymer according to (5), employing a transesterification catalyst consisting of at least one selected from vanadium chloride-based compounds, titanium chloride-based compounds, zirconium chloride-based compounds and hafnium chloride-based compounds as a Lewis acid;

(7) the method for producing a fluorine-containing (meth)acrylate polymer according to (6), employing titanium tetrachloride as a Lewis acid;

(8) the method for producing a fluorine-containing (meth)acrylate polymer according to (5), employing a transesterification catalyst consisting of at least one selected from acetylacetonato complexes of vanadium-based compounds, titanium-based compounds, zirconium-based compounds and hafnium-based compounds as a transesterification catalyst;

(9) the method for producing a fluorine-containing (meth)acrylate polymer according to (5), employing a transesterification catalyst consisting of at least one selected from tetrahydroxyfuran complexes of vanadium chloride-based compounds, titanium chloride-based compounds, zirconium chloride-based compounds and hafnium chloride-based compounds as a transesterification catalyst;

(10) the method for producing a fluorine-containing (meth)acrylate polymer according to (5), employing a transesterification catalyst consisting of at least one selected from alkoxides of vanadium-based compounds, titanium-based compounds, zirconium-based compounds and hafnium-based compounds as a transesterification catalyst;

(11) the method for producing a fluorine-containing (meth)acrylate polymer according to (5), employing a transesterification catalyst consisting of at least one selected from fluorine-containing alkoxides of vanadium-based compounds, titanium-based compounds, zirconium-based compounds and hafnium-based compounds as a transesterification catalyst;

(12) the method for producing a fluorine-containing (meth)acrylate polymer according to any of (1) to (11), employing an organic solvent containing a fluorine atom as a non-reactive solvent;

(13) a fluorine-containing (meth)acrylate polymer obtained via a transesterification by reacting a (meth)acrylate polymer with an alcohol containing a fluorine atom represented by General Formula 1:

$$R_f(CH_2)_nOH \qquad (1)$$

wherein $R_f$ is a fluoroalkyl group or a fluoroalkyl ether group of 1 to 15 carbon atoms containing at least one or more fluorine atoms and n is an integer of 0 to 10; and,

(14) The fluorine-containing (meth)acrylate polymer according to (13) wherein the fluorine content is 1 to 50% by weight and the glass transition temperature is 40° C. to 120° C.

The invention is a method for producing a fluorine-containing (meth)acrylate polymer comprising:

reacting a (meth)acrylate polymer with an alcohol containing a fluorine atom represented by General Formula 1:

$$R_f(CH_2)_nOH \qquad (1)$$

wherein $R_f$ is a fluoroalkyl group or a fluoroalkyl ether group of 1 to 15 carbon atoms containing at least one or more fluorine atoms and n is an integer of 0 to 10.

The inventive (meth)acrylate polymer is not limited particularly, and may for example be a polymer consisting of a (meth)acrylate monomer such as methyl (meth)acrylate, ethyl (meth)acrylate, butyl (meth)acrylate, isobutyl (meth)acrylate, t-butyl (meth)acrylate, benzyl (meth)acrylate, cyclohexyl (meth)acrylate and the like, as well as a copolymer thereof. Among those listed above, a polymer of methyl methacrylate is preferred in view of the reactivity and the cost.

The (meth)acrylate polymer may be copolymerized with a monomer which is copolymerizable with a (meth)acrylate monomer such as (meth)acrylic acid, styrene, α-methylstyrene, maleic acid anhydride and the like.

The (meth)acrylate polymer according to the invention may be a linear polymer or a block polymer, core-shell polymer, branched polymer, ladder polymer or crosslinked polymer. As a block polymer, a block polymer of any type, such as A-B type, A-B-C type, A-B-A type or other types may be employed. A core-shell polymer may consist of only one layer of the core and only one layer of the shell, each of which may also be of a multilayer.

In an alcohol containing a fluorine atom represented by General Formula 1:

$$R_f(CH_2)_nOH \qquad (1)$$

according to the invention, $R_f$ is not limited particularly as long as it is a fluoroalkyl group or a fluoroalkyl ether group of 1 to 15 carbon atoms containing at least one or more fluorine atoms.

As used herein, a fluoroalkyl group means one having a linear chain such as $CF_3(CF_2)_b$ (wherein b is an integer of 0 to 14) or $CF_2H(CHF)_c(CF_2)_d$ (wherein each of c and d is an integer of 0 or more, and c+d=0 to 14), or one having a branched structure such as $(CF_3)_3C$.

Also as used herein, a fluoroalkyl ether group means one having a linear chain such as $CF_3O(CF_2)_eO(CF_2)_f$ (e+f=integer of 1 to 14, and e is an integer of 1 or more) or $CF_2HO(CHF)_gO(CF_2)_h$ (g+h=integer of 1 to 14, and g is an integer of 1 or more) or one having a branched structure such as $(CF_3)_3CO(CF)_j$ (wherein j is an integer of 0 to 10).

Also in an alcohol containing a fluorine atom represented by General Formula 1:

$$R_f(CH_2)_nOH \qquad (1)$$

according to the invention, n representing the number of repeating units may be any integer of 0 to 10, although n is preferably 2 or more when the electron withdrawing property of the fluorine atom is extremely high since it results in a reduced nucleophilic property of the alcohol containing a fluorine atom which leads to a reduced reactivity.

The alcohol containing a fluorine atom may for example be 2,2,2-trifluoro-1-ethanol, 2,2,3,3,3-pentafluoro-1-propanol, 7,7,8,8,8-pentafluoro-1-octanol, 2,2,3,3,4,4,4-heptafluoro-1-butanol, 3,3,4,4,5,5,6,6,6-nonafluoro-1-hexanol, 4,4,5,5,6,6,7,7,7-nonafluoro-1-heptanol, 7,7,8,8,9,9,10,10,10-nonafluoro-1-decanol, 2-perfluoropropoxy-2,2,3,3-tetrafluoropropanol, 2-(perfluorohexyl)ethanol, 2-(perfluorohexyl)propanol, 6-(perfluorohexyl)hexanol, 2-(perfluorooctyl)ethanol, 3-(perfluorooctyl)propanol, 6-(perfluorooctyl)hexanol, 2-(perfluorodecyl)ethanol, 1H,1H-2,5-di(trifluoromethyl)-3,6-dioxaundecafluorononanol, 6-(perfluoro-1-methylethyl)-hexanol, 2-(perfluoro-3-methylbutyl)-ethanol, 2-(perfluoro-5-methylhexyl)-ethanol, 2-(perfluoro-7-methyloctyl)-ethanol, 1H,1H,3H-tetrafluoropropanol, 1H,1H,5H-octafluoropentanol, 1H,1H,7H-dodecafluoroheptanol, 1H,1H,9H-hexadecafluorononanol, 2H-hexafluoro-2-propanol, 1H,1H,3H-hexafluorobutanol, 2,2-bis(trifluoromethyl)propanol and the like.

In the invention, a (meth)acrylate polymer may be reacted with an alcohol containing a fluorine atom in the presence of a transesterification catalyst. The transesterification catalyst promotes the reaction rate of the transesterification reaction by which a substituent on an ester group is converted as in a reaction of the invention.

In the invention, any commonly used transesterification catalyst can be employed, including alkaline metal carbonates, alkaline metal bicarbonates, alkaline earth metal carbonates, alkaline earth metal bicarbonates, alkaline metal hydroxides, alkaline earth metal hydroxides, Lewis acids, protic acids and the like.

As used herein, an alkaline metal carbonate refers to lithium carbonate, potassium carbonate, sodium carbonate, rubidium carbonate, cesium carbonate, francium carbonate, with potassium carbonate and cesium carbonate being especially preferred.

An alkaline earth metal carbonate refers to magnesium carbonate, calcium carbonate, strontium carbonate, barium carbonate, with magnesium carbonate and calcium carbonate being especially preferred.

An alkaline metal bicarbonate refers to lithium bicarbonate, potassium bicarbonate, sodium bicarbonate, rubidium bicarbonate, cesium bicarbonate, francium bicarbonate, with potassium bicarbonate being especially preferred.

A Lewis acid is a compound capable of receiving an electron pair, and typically includes a metal compound capable of receiving an electron pair such as tin-based compounds, zinc-based compounds, ytterbium-based compounds, titanium-based compounds, vanadium-based compounds, zirconium-based compounds, hafnium-based compounds, scandium-based compounds, manganese-based compounds, nickelbased compounds, samarium-base compounds, cadmium-based compounds, cobalt-based compounds, aluminum-based compounds, indium-based compounds, lanthanum-based compounds, with titanium-based compounds, vanadium-based compounds, zirconium-based compounds and hafnium-based compounds being preferred. Among the compounds listed above, vanadium chloride-based compounds, titanium chloride-based compounds, zirconium chloride-based compounds and hafnium chloride-based compounds are preferred in view of an improvement in the reaction efficiency. For example, titanium tetrachloride, titanium trichloride, titanium dichlorodiisopropoxide, vanadyl chloride ($VOCl_2$), zirconium chloride, hafnium chloride can be contemplated. Among these, titanium tetrachloride is more preferred because of its higher reaction rate.

Also in view of handling in air, the abovementioned vanadium chloride-based compounds, titanium chloride-based compounds, zirconium chloride-based compounds and hafnium chloride-based compounds are preferably in the form of a tetrahydrofuran complex. For example, tetrachlorobis(tetrahydrofuran)zirconium, tetrachlorobis(tetrahydrofuran)titanium, tetrachlorobis(tetrahydrofuran)hafnium can be contemplated.

Because of the same reason, an acetyl acetonato complex is employed preferably. For example, vanadyl acetyl acetonato ($VO(acac)_2$), titanium acetyl acetonato diisopropoxide, hafnium acetyl acetonato, zirconium acetyl acetonato can be contemplated.

Such a titanium-based compound, vanadium-based compound, zirconium-based compound and hafnium-based compound is preferably an alkoxide, which undergoes no generation of hazardous hydrogen chloride during a reaction. For example, titanium tetramethoxide, titanium tetraisopropoxide, titanium n-tetrabutoxide, zirconium n-butoxide, zirconium t-butoxide, zirconium n-propoxide, zirconium isopropoxide, zirconium ethoxide, hafnium tetra-t-butoxide may be contemplated. These compounds are preferably fluorine-containing alkoxides in view of an increased reaction efficiency. For example, a compound represented by $Ti(O-R_{fc})_4$ (wherein $R_{fc}$ is a fluoroalkyl group or a fluoroalkyl ether group of 1 to 15 carbon atoms containing at least one or more fluorine atoms) and a vanadyl triflate ($VO(SO_3CF_3)_2$) can be exemplified.

Among the Lewis acid catalysts, those in the form of a carbonate such as zirconium carbonate, scandium carbonate and the like, and those in the form of a trifluoromethanesulfonate or an alkyl sulfonate such as scandium trifluoromethanesulfonate, ytterbium trifluoromethanesulfonate, tin trifluoromethanesulfonate, indium trifluoromethanesulfonate, hafnium trifluoromethanesulfonate, lanthanum trifluoromethanesulfonate and the like can also be employed preferably.

A protic acid is a substance capable of releasing $H^+$, and typically includes hydrogen chloride, hydrogen sulfide, sulfuric acid, acetic acid, p-toluenesulfonic acid, trifluoromethanesulfonic acid and the like.

An transesterification catalyst employed may be used alone or in a mixture of several types, as long as a transesterification reaction can be proceeded.

While the amount of an alcohol containing a fluorine atom added according to the invention may vary as long as a transesterification reaction can substantially be proceeded, the ratio of the molar number of the alcohol containing a fluorine atom (B) to the molar number of the ester groups in the (meth)acrylate polymer (A) {i.e., (B)/(A)} is preferably 0.01 to 2.0 in general, with 0.02 to 1.5 being more preferred.

While the amount of a transesterification catalyst added according to the invention may vary as long as a transesterification reaction can substantially be proceeded, the ratio of the molar number of the transesterification catalyst (C) to the molar number of the ester groups in the (meth)acrylate polymer (A) {i.e., (C)/(A)} is preferably 0.0001 to 1.0 in general, with 0.001 to 0.5 being more preferred.

In an inventive method, a (meth)acrylate polymer is dissolved in a non-reactive solvent which is inert to the transesterification reaction, and then reacted with an alcohol containing a fluorine atom.

A reaction vessel in which the transesterification reaction is conducted after dissolving the (meth)acrylate polymer in the non-reactive solvent is not limited particularly as long as it has a structure allowing the dissolved solution to be heated and stirred and allowing the alcohol containing a fluorine atom to be added, and the reaction may be conducted in a pressure container, or in a glass apparatus under an atmospheric pressure. Also by removing a by-product alcohol, the reaction can frequently be promoted, and an apparatus or device for a removal of the reaction by-product from the reaction system may optionally be employed, and an adsorbent such as a molecular sieve which adsorbs the by-product exclusively or a reactant which reacts with the by-product exclusively may also be employed for such a removal.

When the boiling point of the non-reactive solvent or the alcohol containing a fluorine atom employed is extremely low, a pressure container is employed preferably since the transesterification reaction often requires a high temperature.

While the non-reactive solvent is not limited particularly as long as it allows a (meth)acrylate polymer to be dissolved, it is preferably a solvent capable of dissolving also a reaction product fluorine-containing (meth)acrylate polymer, and those employed preferably are benzotrifluoride, 2-chloro-benzotrifluoride, 4-chloro-benzotrifluoride and the like in view of an increase in the reaction rate.

The concentration of a (meth)acrylate polymer based on a non-reactive solvent is preferably high in view of the production cost, and the concentration as a solid is 5 to 80%, especially 10 to 70% is preferred.

In the present invention, a transesterification catalyst, an unreacted alcohol containing a fluorine atom and a reaction by-product alcohol can be separated according to a standard method from a reaction product fluorine-containing (meth)acrylate polymer, which is then subjected if necessary to a purification treatment such as filtration, solvent extraction and evaporation and then yielded as a desired product.

The fluorine content of a fluorine-containing (meth)acrylate polymer obtained by a method of the invention described above is preferably 1 to 50% by weight, and the glass transition temperature is preferably 40° C. to 120° C. More preferably, the fluorine content is 1 to 30% by weight, and the glass transition temperature is 40° C. to 120° C. When a glass transition temperature is too low, the heat resistance may deteriorate. When a glass transition temperature is too high, the moldability may deteriorate.

As discussed above, by reacting a (meth)acrylate polymer with an alcohol containing a fluorine atom in the presence of a transesterification catalyst, an improvement in the solvent resistance, water-repelling performance, oil-repelling performance, heat decomposition resistance is expected.

Effect of the Invention

According to the invention, a fluorine-containing (meth)acrylate polymer can be obtained readily and simply at a low cost.

BEST MODE FOR CARRYING OUT THE INVENTION

Figure 1:
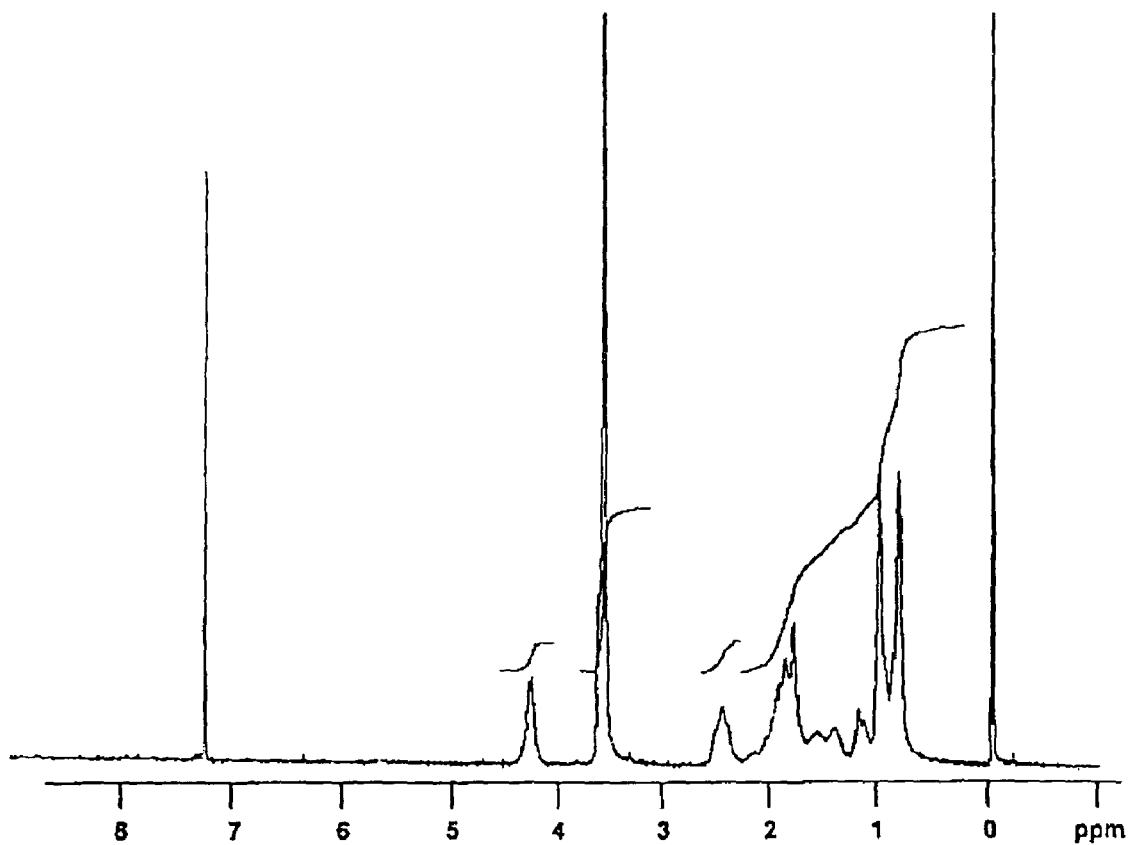
FIG. 1 shows a $^1$H-NMR spectrum of a product.

The invention is further detailed in Examples, to which the invention is not limited.

EXAMPLES

In the following Examples and Comparatives, physical parameters were measured as described below.

(1) Reaction Rate Measurement

A sample formed by dissolving 10 mg of a reaction product in 1 g of deuterated chloroform was subjected to a $^1$H-NMR (Varian Gemini-300 MHz), and the integrated value of the OCH$_3$ group of the polymethyl methacrylate detected near 3.5 to 3.7 ppm divided by 3 was designated as (D), and the integrated value of the C(=O)OCH$_2$— of the ester group of the reaction product fluorine-containing (meth)acrylate polymer detected near 4.1 to 4.4 ppm divided by 2 was designated as (E), and the reaction rate was calculated as (E)/{(D)+(E)}.

(2) Fluorine Content Measurement

The fluorine content of a reaction product was measured in such a procedure that an oxygen flask combustion method was employed to decompose the reaction product and then an ion chromatograph (DX-500, manufactured by DYONEX Corporation) was employed together with IonPac AG12A and AS12A (4 mmφ×250 mm) as columns and 0.3 mM NaHCO$_3$+2.7 mM Na$_2$CO$_3$ as an eluent at a flow rate of 1.2 mL/min while detecting with an electric conductivity detector, and then the calculation was based on the calibration curve obtained using a fluoride ion standard solution (manufactured by KANTO CHEMICAL Co., Inc).

(3) Glass Transition Temperature (Tg)

10 mg of a product was subjected to a differential scanning calorimeter (DSC, DSC-50, manufactured by SHIMADZU Corporation,) under a nitrogen atmosphere at a temperature elevation rate of 20° C./min, and a midpoint method was employed.

Example 1

Chlorobenzene System

A 10 MPa pressure resistant 50 mL autoclave (manufactured by, Taiatsu Techno Corporation) was charged at room temperature with 1.0 g of a commercially available (meth) acrylate polymer (SUMIPEX LG, manufactured by Sumitomo Chemical Co., Ltd.), 2.64 g of 3,3,4,4,5,5,6,6,6-nonafluoro-1-hexanol as an alcohol containing a fluorine atom, 10 mL of chlorobenzene as a non-reactive solvent and 365 mg of vanadyl (IV) triflate (VO(SO$_3$CF$_3$)$_2$) as a transesterification catalyst, and then closed tightly. Thereafter, the autoclave was immersed in an oil bath heated at 220° C. for 9 hours to effect the reaction. After allowing to cool, the reaction mixture was subjected to a 4-fold dilution with methylene chloride and the resultant solution was added dropwise to methanol whereby effecting re-precipitation, followed by filtration/drying to recover the product. The reaction rate of the resultant fluorine-containing (meth)acrylate polymer was calculated to be 20%, and the fluorine content was 23 wt % and the glass transition temperature was 79° C. As a reference, the $^1$H-NMR spectrum of the product was shown in FIG. 1.

Examples 2 to 3

The transesterification catalysts shown in Table 1 were employed and otherwise Example 1 was followed. The resultant fluorine-containing (meth)acrylate polymers had the values of the reaction rate, fluorine content and glass transition temperature summarized in Table 1.

TABLE 1

| Example | Transesterification catalyst | Amount | Reaction rate | Fluorine content | Glass transition temperature |
|---|---|---|---|---|---|
| 1 | VO(SO$_3$CF$_3$)$_2$ | 365 mg | 20% | 23 wt % | 79° C. |
| 2 | TiCl$_4$ | 100 mg | 12% | 16 wt % | 87° C. |
| 3 | Ti(OiPr)$_4$ | 350 mg | 3% | 5 wt % | 98° C. |

Example 4

2-chloro-benzotrifluoride System

A 10 MPa pressure resistant 50 mL autoclave (manufactured by Taiatsu Techno Corporation) was charged with 1.0 g of a commercially available polymethyl methacrylate (SUMIPEX LG, manufactured by Sumitomo Chemical Co., Ltd.), 2.64 g of 3,3,4,4,5,5,6,6,6-nonafluoro-1-hexanol as an alcohol containing a fluorine atom, 10 ml of 2-chlorobenzotrifluoride as a non-reactive solvent and 100 mg of titanium tetrachloride as a transesterification catalyst, which were then reacted at 220° C. for 9 hours. After allowing to cool, the reaction mixture was subjected to a 4-fold dilution with methylene chloride and the resultant solution was added dropwise to methanol whereby effecting reitation, precipitation, followed by filtration/drying to recover the product.

The reaction rate of the resultant fluorine-containing (meth)acrylate polymer was calculated to be 30%, and the fluorine content was 30 wt % and the glass transition temperature was 58° C. (Table 2).

Example 5

A 10 MPa pressure resistant 50 mL autoclave (manufactured by Taiatsu Techno Corporation) was charged with 1.0 g of a commercially available polymethyl methacrylate (SUMIPEX LG, manufactured by Sumitomo Chemical Co., Ltd.), 2.90 g of 3,3,4,4,5,5,6,6,6-nonafluoro-1-hexanol as an alcohol containing a fluorine atom, 10 ml of 2-chlorobenzotrifluoride as a non-reactive solvent and 140 mg of potassium carbonate as a transesterification catalyst, which were then reacted at 220° C. for 9 hours. After allowing to cool, the reaction mixture was subjected to a 4-fold dilution with methylene chloride and the resultant solution was added dropwise to methanol whereby effecting re-precipitation, followed by filtration/drying to recover the product. The reaction rate of the resultant fluorine-containing (meth)acrylate polymer was calculated to be 5%, and the fluorine content was 8 wt % and the glass transition temperature was 98° C. (Table 2).

Example 6 to 10

The transesterification catalysts shown in Table 2 were employed and otherwise Example 4 was followed. The resultant fluorine-containing (meth)acrylate polymers had the values of the reaction rate, fluorine content and glass transition temperature summarized in Table 2.

TABLE 2

| Example | Transesterification catalyst | Amount | Reaction rate | Fluorine content | Glass transition temperature |
|---------|------------------------------|--------|---------------|------------------|------------------------------|
| 4 | $TiCl_4$ | 100 mg | 30% | 30 wt % | 58° C. |
| 5 | $K_2CO_3$ | 140 mg | 5% | 8 wt % | 98° C. |
| 6 | $ZrCl_4$ | 233 mg | 7% | 10 wt % | 95° C. |
| 7 | $AlCl_3$ | 133 mg | 3% | 5 wt % | 100° C. |
| 8 | $CoCl_2$ | 130 mg | 2% | 3 wt % | 102° C. |
| 9 | $ZnCl_2$ | 207 mg | 3% | 5 wt % | 99° C. |
| 10 | $HfCl_4$ | 320 mg | 7% | 10 wt % | 94° C. |

Example 11

Acetyl Acetonato Complex 362 mg of titanium diisopropoxide acetyl acetonato complex was employed as a transesterification catalyst and otherwise Example 4 was followed. The resultant fluorine-containing (meth)acrylate polymers had the values of the reaction rate, fluorine content and glass transition temperature summarized in Table 3.

TABLE 3

| Example | Transesterification catalyst | Amount | Reaction rate | Fluorine content | Glass transition temperature |
|---------|------------------------------|--------|---------------|------------------|------------------------------|
| 11 | $Ti(o-i-Pr)_2(acac)_2$ | 362 mg | 4% | 6 wt % | 99° C. |

Example 12

Tetrahydrofuran Complex System 334 mg of tetrachloro-bis(tetrahydrofuran)titanium was employed as a transesterification catalyst and otherwise Example 4 was followed. The resultant fluorine-containing (meth)acrylate polymers had the values of the reaction rate, fluorine content and glass transition temperature summarized in Table 4.

Example 13

540 mg of tetrachloro-bis(tetrahydrofuran)zirconium was employed as a transesterification catalyst and otherwise Example 4 was followed. The resultant fluorine-containing (meth)acrylate polymers had the values of the reaction rate, fluorine content and glass transition temperature summarized in Table 4.

TABLE 4

| Example | Transesterification catalyst | Amount | Reaction rate | Fluorine content | Glass transition temperature |
|---------|------------------------------|--------|---------------|------------------|------------------------------|
| 12 | $TiCl_4(THF)_2$ | 334 mg | 11% | 15 wt % | 89° C. |
| 13 | $ZrCl_4(THF)_2$ | 540 mg | 2% | 3 wt % | 102° C. |

Example 14

550 mg of $Ti(OCH_2CH_2CF_2CF_2CF_2CF_3)_4$ was employed as a transesterification catalyst and otherwise Example 4 was followed. The resultant fluorine-containing (meth)acrylate polymers had the values of the reaction rate, fluorine content and glass transition temperature summarized in Table 5.

TABLE 5

| Example | Transesterification catalyst | Amount | Reaction rate | Fluorine content | Glass transition temperature |
|---------|------------------------------|--------|---------------|------------------|------------------------------|
| 14 | $Ti(OCH_2CH_2CF_2CF_2CF_2CF_3)_4$ | 550 mg | 35% | 33 wt % | 50° C. |

INDUSTRIAL APPLICABILITY

According to the invention, a fluorine-containing (meth)acrylate polymer can be provided readily at a low cost.

The invention claimed is:

1. A method for producing a fluorine-containing (meth)acrylate polymer comprising:
   reacting a (meth)acrylate polymer with an alcohol containing a fluorine atom represented by General Formula 1:

$$R_f(CH_2)_nOH \quad (1)$$

wherein $R_f$ is a fluoroalkyl group or a fluoroalkyl ether group of 1 to 15 carbon atoms containing at least one or more fluorine atoms and n is an integer of 0 to 10,
   wherein the reaction is conducted in the presence of a transesterification catalyst.

2. The method for producing a fluorine-containing (meth)acrylate polymer according to claim 1, employing a transesterification catalyst consisting of at least one selected from alkaline metal carbonates, alkaline earth metal carbonates, alkaline metal bicarbonates and alkaline metal hydroxides as a transesterification catalyst.

3. The method for producing a fluorine-containing (meth)acrylate polymer according to claim 1, employing a transesterification catalyst consisting of at least one selected from Lewis acids and protic acids as a transesterification catalyst.

4. The method for producing a fluorine-containing (meth)acrylate polymer according to claim 3, employing a transesterification catalyst consisting of at least one selected from vanadium-based compounds, titanium-based compounds, zirconium-based compounds and hafnium-based compounds as a Lewis acid.

5. The method for producing a fluorine-containing (meth)acrylate polymer according to claim 4, employing a transesterification catalyst consisting of at least one selected from vanadium chloride-based compounds, titanium chloride-based compounds, zirconium chloride-based compounds and hafnium chloride-based compounds as a Lewis acid.

6. The method for producing a fluorine-containing (meth)acrylate polymer according to claim 5, employing titanium tetrachloride as a Lewis acid.

7. The method for producing a fluorine-containing (meth)acrylate polymer according to claim 4, employing a transesterification catalyst consisting of at least one selected from acetylacetonato complexes of vanadium-based compounds, titanium-based compounds, zirconium-based compounds and hafnium-based compounds as a transesterification catalyst.

8. The method for producing a fluorine-containing (meth)acrylate polymer according to claim 4, employing a transesterification catalyst consisting of at least one selected from tetrahydroxyfuran complexes of vanadium chloride-based compounds, titanium chloride-based compounds, zirconium chloride-based compounds and hafnium chloride-based compounds as a transesterification catalyst.

9. The method for producing a fluorine-containing (meth) acrylate polymer according to claim 4, employing a transesterification catalyst consisting of at least one selected from alkoxides of vanadium-based compounds, titanium-based compounds, zirconium-based compounds and hafnium-based compounds as a transesterification catalyst.

10. The method for producing a fluorine-containing (meth) acrylate polymer according to claim 4, employing a transesterification catalyst consisting of at least one selected from fluorine-containing alkoxides of vanadium-based compounds, titanium-based compounds, zirconium-based compounds and hafnium-based compounds as a transesterification catalyst.

11. The method for producing a fluorine-containing (meth) acrylate polymer according to any of claims 1 to 10, employing an organic solvent containing a fluorine atom as a non-reactive solvent.

* * * * *